V. T. PALMER.
WINDMILL.
APPLICATION FILED MAR. 20, 1913.
1,130,326.
Patented Mar. 2, 1915.
2 SHEETS—SHEET 1.
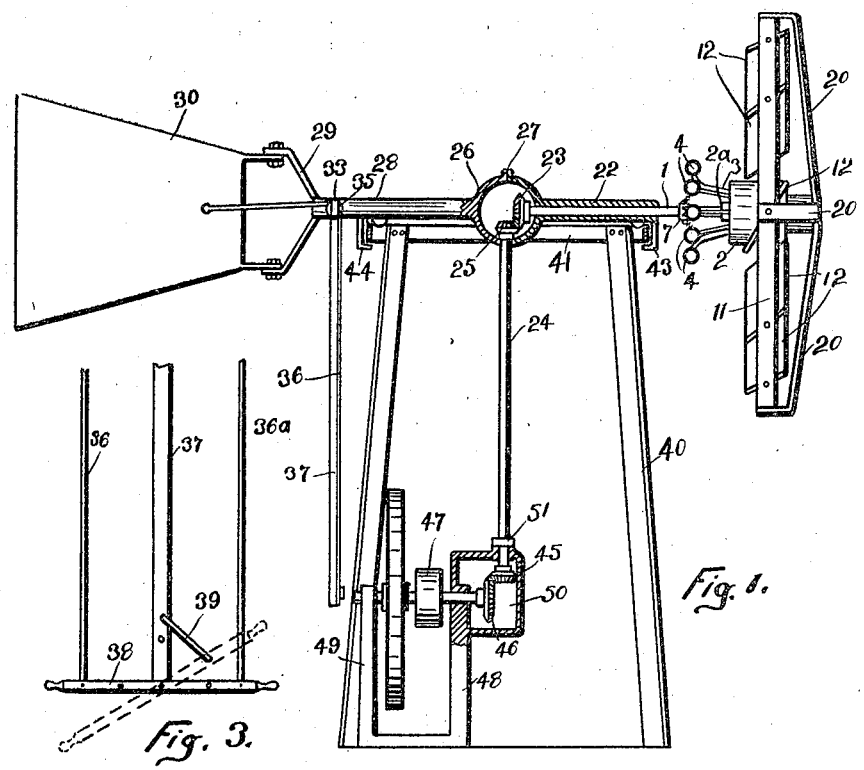
Fig. 1.
Fig. 3.
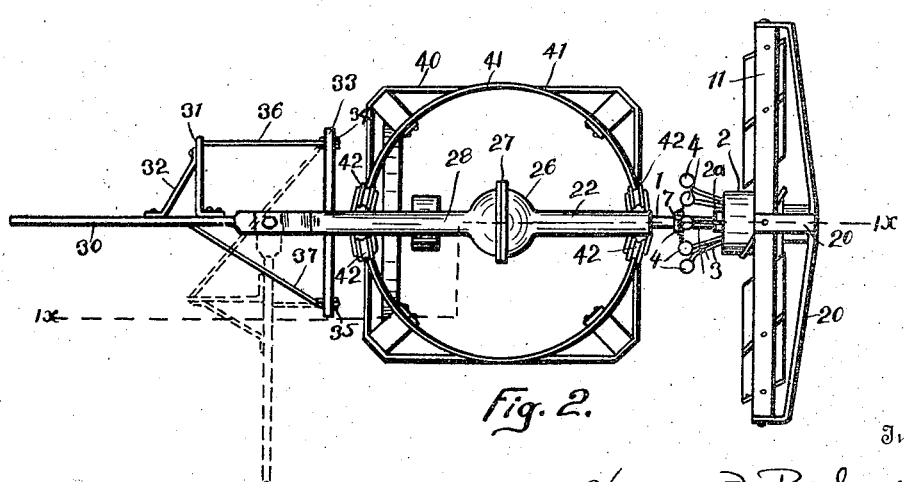
Fig. 2.
Witnesses
Eric Ischinger.
Lena M. Ash.
Inventor
Verne T. Palmer
By Frank Keifer
Attorney

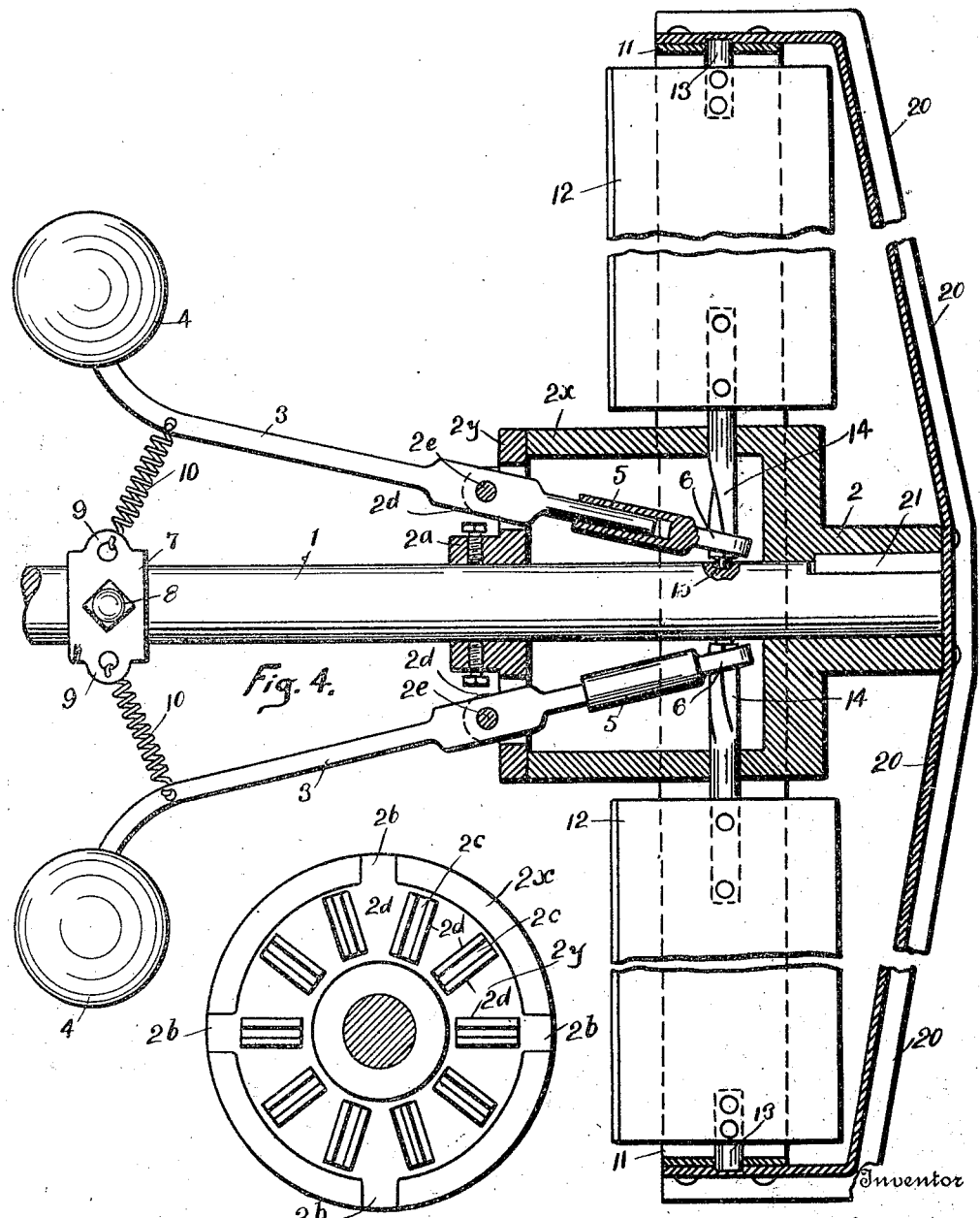

UNITED STATES PATENT OFFICE.

VERNE T. PALMER, OF TUSCARORA, NEW YORK.

WINDMILL.

1,130,326.

Specification of Letters Patent.

Patented Mar. 2, 1915.

Application filed March 20, 1913. Serial No. 755,766.

*To all whom it may concern:*

Be it known that I, VERNE T. PALMER, a citizen of the United States, residing at Tuscarora, in the county of Livingston and State of New York, have invented certain new and useful Improvements in Windmills, of which the following is a specification.

The object of this invention is to provide a new and improved form of windmill.

Another object of my invention is to provide an improved wind wheel for the windmill, the blades or sails of which will automatically feather so as to keep the wheel rotating at a somewhat uniform angular velocity when the wind is blowing at a variable velocity.

Another object of my invention is to provide an improved mounting for the mechanism of the windmill.

Another object of my invention is to provide an improved adjustment for the vane of the windmill by which the windmill may be thrown into or out of operation.

These and other objects of my invention will be fully illustrated in the drawings, described in the specification and pointed out in the claims at the end thereof.

In the accompanying drawings, Figure 1 is a side elevation of my improved windmill shown partly in section, the section being taken on the line $1^x$—$1^x$ of Fig. 2. Fig. 2 is a top plan view of my improved windmill. Fig. 3 is a detail view of the mechanism for adjusting the vane. Fig. 4 is a detail view showing the shaft and the sails of the windmill with the speed regulator therefor. Fig. 5 is a detail view of the disk $2^y$ shown in Fig. 4.

In the drawings, reference numeral 1 indicates the shaft on which the wheel rotates and by which the power of the wheel is transmitted. On the shaft is mounted a hollow hub or bearing box 2. This hub consists of a circular shell $2^x$ and an end disk $2^y$ which are separate from each other and are fitted together to form the complete hub or bearing box. A disk $2^y$ is provided with a hub or boss $2^a$ which is perforated at suitable intervals for set screws by which it may be clamped to the shaft to prevent longitudinal movement along the shaft. The disk $2^y$ is provided with suitable lugs $2^b$ which engage with corresponding recesses in the shell $2^x$, in the end of the shell $2^x$ by which the parts are held together in the proper angular relation, during the rotation.

The disk $2^y$ is perforated at suitable intervals with the openings $2^c$ on the opposite sides of which are the lugs $2^d$. Through these openings extend the governor arms 3, these arms being pivotally mounted at $2^e$ between the lugs $2^d$. Each of these arms has a weight 4 on the outer end thereof and on the nearer end, each of these arms is provided with a sleeve 5 mounted thereon, which sleeve is adapted to slide in and out at the end of the arm. Each of these sleeves 5 terminates in a flat blade 6 having a square opening therein for purpose that will presently be described.

Mounted to slide upon the shaft 1 is the sleeve 7 which may be clamped in place by the set screw 8. On this sleeve are suitable lugs 9 to which are fastened tension springs 10, one of these springs being provided for each of the governor arms 3. The outer ends of the springs are fastened to the governor arms. The sleeves 7 may be moved along the shaft to increase or decrease the tension on the springs. Connected to the hub $2^x$ in any suitable manner are the T-irons 20—20 upon which the rim of the wheel 11 is supported. Mounted between the rim of the wheel 11 and the hub 24 are the fan blades or sails 12. Each of these blades is provided with a pin 13 at the outer end which engages with a suitable opening in the periphery of the wheel, in which the blade 12 is free to turn. The inner end of the blade is provided with a square shank 14, which shank is engaged by a square opening on the blade 6 on the sleeve 5. The shank 14 has a stepped bearing in the shaft 1 as shown at 15 in Fig. 4. The square shanks 14 are twisted so that as the sleeve 5 moves in and out along the shank, the shank will be rotated by reason of the engagement with the square opening in the flat blade 6. To insure the rotation of all the parts together, namely, the hub and the rim of the wheel, etc., the hub is fastened to the shaft by means of the key 21.

The shaft 1 extends through a suitable sleeve 22 on the inner end of which it is provided with a beveled gear 23. At right angles to the shaft 22 extends the vertical shaft 24 on the upper end of which is provided the beveled gear 25. The gears 23 and 25 are contained in the gear casing 26 which may be divided along any convenient line as indicated at 27 by which the parts may be assembled. On the opposite side of the gear casing, the bar 28 extends, the bar 28, the gear casing 26 and the sleeve 22 forming one complete framework. On the end of the bar 28 is provided the fork 29 between the arms of which is pivotally mounted the vane 30 of the windmill. Fastened to the vane 30 is the bracket 31, held in place by a brace 32. Mounted on the bar 28 is the cross bar 33 on which suitable pulleys 34 and 35 are arranged. Fastened to the end of the bracket 31 is the cable or chain 36 which passes around the pulley 34 and down. Fastened directly to the vane is the cable or chain 36ª which passes over the pulley 35 and down. Depending from the bar 28 is the bar 37 on the lower end of which is fastened the lever 38, to which are fastened the chains or cables 36 and 36ª. By rocking the lever 38, the vane 30 may be swung into or out of line with the bar 28 so that it will stand either perpendicular to the windmill or parallel thereto. A link 39 is provided pivotally mounted on the bar 37 by which the lever 38 may be fastened in any desired angular position, the lever 38 being suitably perforated to receive the upturned end of the link.

The foregoing apparatus is supported on the framework 40 which is built up preferably of angle iron and may be of any suitable skeleton construction. On the top of this framework is provided the circular track 41. Fastened to the framework which embodies the sleeve 22, the gear casing 26 and the bar 28, are the brackets on which the rollers 42 are mounted to rotate. These rollers are mounted with their axes radial to the center of the gear casing 26, and the parts are arranged so that the gear casing 26 and the wind wheel and vane can be rotated around the center of the gear casing so as to place the wind wheel with regard to the direction of the wind. In order to hold the parts firmly on the track, the depending guards 43 and 44 are fastened which engage the lower side of the track 41, the wheels 42 engaging the upper side of the track. The shaft 24 carries on its lower end the beveled gear 45 which meshes with a suitable gear 46 by which the power of the windmill is transmitted to the pulley 47, suitably mounted in the pedestals 48 and 49. The gears 45 and 46 are inclosed in a gear casing 50 and the shaft 24 is provided with a stepped bearing 51 which engages with this gear casing by which the shaft 24 is held in its proper position.

The operation of this invention is as follows: When the parts are assembled as above described and mounted in place, it is ready for operation. The blades of the wheel are set at an angle of about forty-five degrees to the center line of the shaft 1, with the shaft 1 normally pointing into the wind. When the wind blows, the reaction of the wind against the blades will cause the wheel to rotate. As the wheel rotates the governor rotates with it, and as the speed of the wheel increases there is a tendency for the balls 4 to fly out, rocking the governor arms around the centers 16. This causes the inner ends of the governor arms to move in toward the shaft and in so moving they make sliding engagement with the square shanks on the blades. These square shanks are twisted so that as the blade 6 moves inwardly it will cause the blade in engagement therewith to rotate around its vertical axis and the blade will be moved so that its edge will be presented to the wind, decreasing the amount of surface of the blade that is exposed to the wind, and consequently decreasing the energy communicated to the blade by the wind. This in turn will prevent the wheel from accelerating in its rotation. The sleeve 5 is mounted to slide upon the governor arm 3 so that the blade 6 will not bind upon the shank 14 during the operation of the governor. By turning the vane 30 so as to stand perpendicular to the wind wheel, the wind wheel will be held automatically so as to receive the full force of the wind, causing the rotation thereof, subject to the regulation of the governor above described. The wind wheel and its shaft and vane will automatically turn itself around the circular track 41 so as to keep the wheel pointed in to the wind. When it is not desired to use the wind wheel, the vane 30 will be placed parallel thereto by the cables and lever above described so as to make the wheel inoperative in which case the wheel will automatically assume the position in which the wind will blow, perpendicular to the shaft of the wheel rather than in line with the shaft of the wheel.

I claim:

1. In a windmill the combination of a shaft, a wheel consisting of a rim and hub keyed to said shaft, blades or sails radially mounted between said rim and said hub, shanks having square ends fastened to the lower ends of said blades or sails, said square ends of said shanks being slightly twisted, the ends of said shanks being pivotally mounted in suitable recesses in said shaft, a series of levers engaging said twisted square ends of said shanks for the purpose of adjusting the angle of presentation of said blades or sails.

2. In a wind wheel the combination of a shaft, a rim for said wheel, blades or sails for said wheel radially mounted upon the shaft and the rim, each of said blades having a square shank adjacent to the shaft, a series of levers pivotally mounted around the shaft, each of which levers has a sleeve at one end thereof, each of said sleeves having a positive engagement with said square shank, and a ball at the opposite end thereof, a spring for normally holding each of said levers in toward the shaft, said levers operating upon the rotation of the wheel to change their position by centrifugal force and rotate the sails.

3. In a wind mill the combination of a shaft, blades pivotally mounted on radial axes around said shaft, said blades being capable of oscillating on their radial axes, each of said blades having a twisted square shank near the inner end thereof, said shank having a pivotal engagement with the shaft and a pivot pin at the outer end thereof, a rim supported by said shaft, said pivot pin engaging said rim, means moving radially along said square shank to cause the oscillation of said shanks and the blades attached thereto.

4. In a wind mill the combination of a shaft, blades pivotally mounted on radial axes around said shaft, said blades being capable of oscillating on their radial axes, each of said blades having a twisted square shank near the inner end thereof, said shank having a pivotal engagement with the shaft and a pivot pin at the outer end thereof, a rim supported by said shaft, said pivot pin engaging said rim, means moving radially along said square shank to cause the oscillation of said shanks and the blades attached thereto, a governor rotating with said shaft for shifting said means in proportion to the speed of rotation.

5. In a wind mill the combination of a shaft, blades pivotally mounted on radial axes around said shaft, said blades being capable of oscillating on their radial axes, each of said blades having a twisted square shank near the inner end thereof, said shank having a pivotal engagement with the shaft and a pivot pin at the outer end thereof, a rim supported by said shaft, said pivot pin engaging said rim, means moving radially along said square shank to cause the oscillation of said shanks and the blades attached thereto, a shell keyed to said shaft inclosing said means, a governor mounted on said shell to govern the oscillation of said blades.

6. In a wind wheel the combination of a wheel, blades radially mounted therein, said blades being capable of oscillating on their longitudinal axes, each of said blades having a twisted square shank at one end thereof, means moving radially along said shanks to cause the oscillation of said shanks and the blades attached thereto, said means comprising a lever pivotally mounted adjacent to said shank, and a sleeve engaging with the shank and capable of moving in and out along the lever.

In testimony whereof I affix my signature in presence of two witnesses.

VERNE T. PALMER.

Witnesses:
LENA M. ASH,
ERIC ISCHINGER.